US012019353B2

(12) United States Patent
Puckett et al.

(10) Patent No.: US 12,019,353 B2
(45) Date of Patent: Jun. 25, 2024

(54) SYSTEM AND METHOD FOR GENERATING OPTICAL FREQUENCY COMBS USING AN OPTICAL WAVEGUIDE INCLUDING CHIRPED BRAGG GRATINGS

(71) Applicant: HONEYWELL INTERNATIONAL INC., Charlotte, NC (US)

(72) Inventors: Matthew W. Puckett, Phoenix, AZ (US); Chad Hoyt, Plymouth, MN (US); Karl Nelson, Plymouth, MN (US); Jianfeng Wu, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 22 days.

(21) Appl. No.: 18/045,936

(22) Filed: Oct. 12, 2022

(65) Prior Publication Data
US 2024/0126138 A1    Apr. 18, 2024

(51) Int. Cl.
*G02F 1/365*    (2006.01)
*G02F 1/35*    (2006.01)

(52) U.S. Cl.
CPC ............ *G02F 1/365* (2013.01); *G02F 1/3542* (2021.01); *G02F 2201/307* (2013.01); *G02F 2203/56* (2013.01)

(58) Field of Classification Search
None
See application file for complete search history.

(56) References Cited

U.S. PATENT DOCUMENTS 6,999,659 B1 * 2/2006 Nowak ................... G02B 6/14
385/28
7,145,923 B2 * 12/2006 Carter ................. H01S 5/06256
372/102
(Continued)

FOREIGN PATENT DOCUMENTS

WO    2017/087767 A1    5/2017
WO    2021/152174 A1    8/2021
(Continued)

OTHER PUBLICATIONS

Chen, Lawrence R., "Photonic Generation of Chirped Microwave and Millimeter Wave Pulses Based on Optical Spectral Shaping and Wavelength-to-time Mapping in Silicon Photonics," Optics Communications 373 (2016), Apr. 10, 2015, p. 70-81.
(Continued)

*Primary Examiner* — Rhonda S Peace
(74) *Attorney, Agent, or Firm* — Lorenz & Kopf LLP

(57) ABSTRACT

An optical frequency comb generation system includes an optical waveguide portion having a uniform width, a first chirped Bragg grating disposed at one end of the optical waveguide portion and a second chirped Bragg grating disposed at the other end of the optical waveguide portion. The first chirped Bragg grating includes at least a first periodic variation having a first refractive index and a second periodic variation having a second refractive index. The second chirped Bragg grating includes the at least first and second periodic variations. A first cavity associated with a first resonant frequency extends between the first periodic
(Continued)

variation of the first chirped Bragg grating and the first periodic variation of the second chirped Bragg grating. A second cavity associated with a second resonant frequency extends between the second periodic variation of the first chirped Bragg grating and the second periodic variation of the second chirped Bragg grating.

20 Claims, 5 Drawing Sheets

(56) References Cited

U.S. PATENT DOCUMENTS

| | | | |
|---|---|---|---|
| 7,180,601 B1* | 2/2007 | Davis | G01J 3/1895 |
| | | | 356/480 |
| 7,580,184 B2 | 8/2009 | Shu et al. | |
| 7,982,944 B2 | 7/2011 | Kippenberg et al. | |
| 8,270,789 B2 | 9/2012 | Ogawa et al. | |
| 9,735,533 B2 | 8/2017 | Barre et al. | |
| 10,261,260 B2* | 4/2019 | Mir Shafiei | G02B 6/12007 |
| 10,270,529 B2 | 4/2019 | Karpov et al. | |
| 10,731,969 B2* | 8/2020 | Han | G01J 3/18 |
| 11,016,363 B2 | 5/2021 | Lin et al. | |
| 11,429,010 B1* | 8/2022 | Puckett | G02F 1/113 |
| 2003/0147588 A1* | 8/2003 | Pan | G02B 6/02138 |
| | | | 385/37 |
| 2004/0037505 A1 | 2/2004 | Morin | |
| 2006/0251424 A1 | 11/2006 | Nicholson et al. | |
| 2011/0013269 A1 | 1/2011 | Ogawa et al. | |
| 2016/0079735 A1 | 3/2016 | Shahine | |
| 2019/0227350 A1 | 7/2019 | Puckett et al. | |
| 2021/0026223 A1 | 1/2021 | Stern et al. | |
| 2021/0096444 A1 | 4/2021 | Zhang et al. | |
| 2021/0242654 A1 | 8/2021 | Tang et al. | |
| 2022/0026780 A1 | 1/2022 | Gui et al. | |
| 2022/0121084 A1 | 4/2022 | Bowers et al. | |

FOREIGN PATENT DOCUMENTS

| | | |
|---|---|---|
| WO | 2021/194630 A2 | 9/2021 |
| WO | 2022118647 A1 | 6/2022 |

OTHER PUBLICATIONS

Cheng, Rui et al., "Fully Tailorable Integrated-Optic Resonators Based on Chirped Waveguide Moire Gratings," Optica vol. 7, No. 6, Jun. 2020.

Kim, Sangsik, et al., "Dispersion Engineering and Frequency Comb Generation in Thin Silicon Nitride Concentric Microresonators," Nature Communications, DOI: 10.1038/s41467-017-00491-x, 2017, downloaded from https://www.nature.com/articles/s41467-017-00491-x on Jun. 22, 2022.

Klitis, Charalambos, et al. "Active On-Chip Dipersion Control Using a Tunable Silicon Bragg Grating," Micromachines Aug. 29, 2019, downloaded from https://www.mdpi.com/2072-666X/10/9/569/pdf on Jun. 22, 2022.

Qin, Chenye, et al. "Electrically Controllable Laser Frequency Combs in Graphene-Fibre Microresonators," Light: Science & Applications (2020) 9:185, downloaded from https://doi.org/10.1038/s41377-020-00419-z on Jun. 22, 2022.

Ricciardi, Iolanda, et al., "Optical Frequency Combs in Quadratically Nonlinear Resonators," Micromachines 2020, 11, 230; doi:10.3390/mi11020230, downloaded from www.mdpi.com/journal/micromachines on Jun. 22, 2022.

Mengxi Tan, Xingyuan Xu, Jiayang Wu, Roberto Morandotti, Arnan Mitchell & David J. Moss (2021) RF and microwave photonic temporal signal processing with Kerr microcombs, Advances in Physics: X, 6:1, 1838946, DOI: 10.1080/23746149.2020.1838946, downloaded from https://doi.org/10.1080/23746149.2020.1838946 on Jun. 22, 2022.

Xie, Shengjie, et al., "On-Chip Fabry-Perot Bragg Grating Cavity Enhanced Four-Wave Mixing," ACS Photonics Mar. 13, 2020, 7, 1009-1015, downloaded from https://par.nsf.gov/servlets/purl/10281079 on Jun. 22, 2022.

Xu, Chao and Dayan Ban, "Design of Chirped Distributed Bragg Reflector for Octave-Spanning Frequency Group Velocity Dispersion Compensation in Terahertz Quantum Cascade Laser," Jun. 13, 2016, Optics Express, vol. 24, No. 12.

Yum, Honam N., et al. "The Fundamental Limitations on the Practical Realizations of White Light Cavities," Optics Commujnications 305 (May 23, 2013) 260-266, downloaded from http://lapt.eecs.northwestern.edu/files/2013-000.pdf on Jun. 22, 2022.

Siaowei Dong et al. "Study on FabryPerot cavity consisting of two chirped fiber Bragg gratings", Optical Filber Technology, vol. 18 No. Jun. 4, 22, 2012 pp. 209-214 XP28426863.

Guan Xiangshuai et al. "Optical frequency comb with tunable free spectral range based on two Mach-Zehnder modulators cascaded with linearly chirped fiber Bragg grating and phase modulator", Optoelectronics Letter, vol. 18 No. 7, Aug. 17, 2022 pp. 385-389; url: https://link.springer.com/content/pdf/10.1007/s11801-022-2011-z.pdf XP93132959.

Yao Jianping et al. "Fully Reconfigurable 1-15 Waeguide Bragg Gratings for Programmable Photonic Signal Processing" Journal of Lightwave Technology, IEEE< USA, vol. 38, No. 2, Dec. 18, 2019 pp. 202-214 XP11767411.

* cited by examiner

SYSTEM AND METHOD FOR GENERATING OPTICAL FREQUENCY COMBS USING AN OPTICAL WAVEGUIDE INCLUDING CHIRPED BRAGG GRATINGS

STATEMENT REGARDING FEDERALLY SPONSORED RESEARCH OR DEVELOPMENT

This invention was made with Government support under HR0011-22-C-0018 awarded by DARPA. The Government has certain rights in the invention.

TECHNICAL FIELD

The present invention generally relates to optical frequency comb generation systems and more particularly relates to a system and method for generating optical frequency combs using a optical waveguide including chirped Bragg gratings.

BACKGROUND

An increasing number of integrated photonic applications are employing the use of optical frequency combs. An optical frequency comb has a periodic intensity profile in the time domain. This translates into a spectrum of evenly spaced narrow optical frequencies in the spectral domain.

An optical frequency comb generation system is typically configured to exhibit an anomalous dispersion to generate optical frequency combs. An anomalous dispersion occurs when the second derivative index of refraction with respect to a wavelength of a light beam has a negative value. This is often a challenging condition to satisfy in many integrated photonics platforms. In many cases, strict constraints are placed on optical waveguide platforms used to generate optical frequency combs to fulfil this condition. Such constraints may limit the ease with which optical frequency combs may be implemented in different applications.

Hence there is a need for optical frequency comb generation systems that employ alternative techniques for creating an anomalous dispersion to facilitate the generation of optical frequency combs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An exemplary embodiment of an optical frequency comb generation system includes a uniform optical waveguide portion having a uniform width, a first chirped Bragg grating disposed at a first end of the uniform optical waveguide portion, and a second chirped Bragg grating disposed at a second end of the uniform optical waveguide portion. The first chirped Bragg grating includes at least first and second periodic variations. The first periodic variation has a first refractive index and the second periodic variation has a second refractive index. The second chirped Bragg grating includes the at least first and second periodic variations. A first cavity associated with a first resonant frequency extends between the first periodic variation of the first chirped Bragg grating and the first periodic variation of the second chirped Bragg grating. A second cavity associated with a second resonant frequency extends between the second periodic variation of the first chirped Bragg grating and the second periodic variation of the second chirped Bragg grating.

An exemplary embodiment of a method of generating an optical frequency comb includes providing an optical resonator. The optical resonator includes a uniform optical waveguide portion having a uniform width, a first chirped Bragg grating disposed at a first end of the uniform optical waveguide portion, and a second chirped Bragg grating disposed at a second end of the uniform optical waveguide portion. The first chirped Bragg grating includes at least first and second periodic variations. The first periodic variation has a first refractive index and the second periodic variation has a second refractive index. The second chirped Bragg grating includes the at least first and second periodic variations. A first cavity associated with a first resonant frequency extends between the first periodic variation of the first chirped Bragg grating and the first periodic variation of the second chirped Bragg grating. A second cavity associated with a second resonant frequency extends between the second periodic variation of the first chirped Bragg grating and the second periodic variation of the second chirped Bragg grating. The method further includes receiving a first light beam having a first wavelength at the first chirped Bragg grating, the first wavelength corresponding to the first resonant frequency associated with the first cavity and generating an optical frequency comb at the second chirped Bragg grating, the optical frequency comb comprising at least the first light beam having the first wavelength and a second light beam having a second wavelength corresponding to the second resonant frequency of the second cavity.

Furthermore, other desirable features and characteristics of the system and method for generating optical frequency combs using chirped Bragg gratings will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
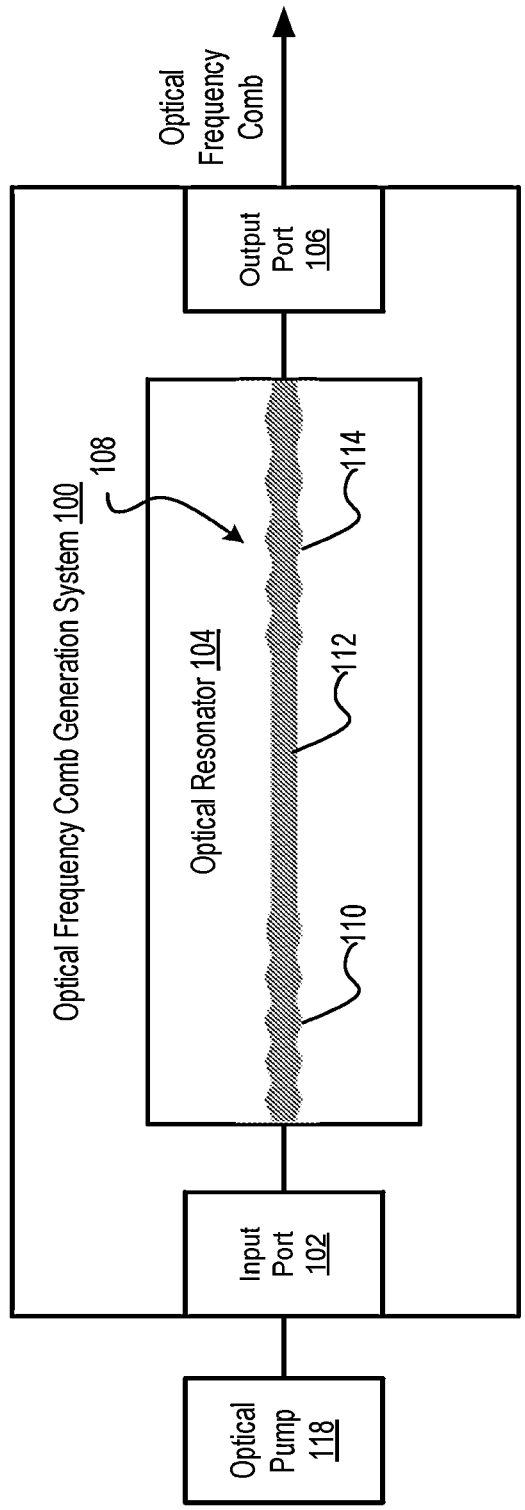
FIG. 1 is a block diagram representation of an exemplary embodiment of an optical frequency comb generation system including an optical waveguide including chirped Bragg gratings.

Referring to FIG. 1, a block diagram representation of an exemplary embodiment of an optical frequency comb generation system 100 is shown. In an example, the optical frequency comb generation system 100 includes an input port 102, an optical resonator 104, and an output port 106. The optical resonator 104 is coupled to the input port 104 and to the output port 106. The optical resonator 104 includes an optical waveguide 108. In an example, the optical frequency comb generation system 100 is embodied on a semiconductor chip.

The optical waveguide 108 includes a first chirped Bragg grating 110, a uniform optical waveguide portion 112, and a second chirped Bragg grating 114. The uniform optical waveguide portion 112 has a uniform width. The first chirped Bragg grating 110 is disposed at one end of the uniform optical waveguide portion 112 and is coupled to the input port 102. The second chirped Bragg grating 114 is disposed at the other end of the uniform optical waveguide portion 112 and is coupled to the output port 106.

The first chirped Bragg grating 110 includes a plurality of periodic variations. Each of the of periodic variations is associated with a refractive index. The second chirped Bragg grating has the same plurality of periodic variations. In an embodiment, the first chirped Bragg grating has a first non-uniform chirp rate of the plurality of periodic variations and the second chirped Bragg grating 114 has a second non-uniform chirp rate of the plurality of periodic variations. The first non-uniform chirp rate of the first chirped Bragg grating 110 is different from the second non-uniform chirp rate of the second chirped Bragg grating 114.

In an embodiment, the first chirped Bragg grating 110 and the second chirped Bragg grating 114 both have a constant chirp rate. The constant chirp rate of the first chirped Bragg grating 110 is different from the constant chirp rate of the second chirped Bragg grating 114. One of the first and second chirped Bragg gratings 110, 114 has an increasing period as it moves away from the center of the optical resonator 104 defined by the first and second chirped Bragg gratings 110, 114 and has a slower chirp rate than the other one of the first and second chirped Bragg grating 110, 114.

A plurality of cavities are defined between the first chirped Bragg grating 110 and the second chirped Braggs grating 114. Each cavity is defined as extending between one of the periodic variations of the first chirped Braggs grating 110 and the corresponding same periodic variation of the second chirped Braggs grating 114. Each of the plurality of cavities has a resonant frequency based on the periodic variation that defines the cavity. The difference between the first non-uniform chirp rate of the first chirped Braggs grating 110 and the second non-uniform chirp rate of the second Braggs grating 114 produces wavelength dependent cavity lengths such that a portion of different wavelengths of light beams are reflected at different points along the optical waveguide 108 and a portion of the different wavelengths of light beams are transmitted through the second Braggs grating 114 to form an optical frequency comb.

Individual optical comb generation systems 100 are configured to receive an input light beam having a specific wavelength and generate a specific configuration of an optical frequency comb. The input port 102 is configured to be coupled to an optical pump 118. The optical pump 118 is tuned to generate an input light beam having a wavelength that is specifically tuned to the optical comb generation system 100. The optical resonator 104 is configured to receive the input light beam and generate a plurality of equally spaced light beams, where each light beam has a different wavelength, in the form of an optical frequency comb. The optical frequency comb includes the plurality of light beams including a light beam having a wavelength corresponding to the input light beam.

The configuration of the optical frequency comb is based on the configuration of the periodic variations of the first and second chirped Bragg gratings 110, 114. The wavelength of each of the plurality of light beams in the optical frequency comb corresponds to a resonant frequency of one of the plurality of cavities in the optical waveguide 108. The input light beam has a wavelength that corresponds to a resonant frequency of one of the cavities. Each of the other light beams in the optical frequency comb have wavelengths that correspond to a resonant frequency of one of the other cavities. The output port 106 is configured to transmit the optical frequency comb generated by the optical resonator 104.

In an example, the optical frequency comb generation system 100 is configured to be coupled to a high-speed detector (not shown). In an example, the output port 106 of the optical frequency comb detection system 100 is configured to be coupled to the high-speed detector. The high-speed detection receives the optical frequency comb generated by the optical frequency comb generation system 100 as an input and generates a radio frequency (RF) signal including a plurality of electrical signals. Each of the plurality of electrical signals in the RF signal corresponds to a wavelength of one of the plurality of light beams in the optical frequency comb.

When the optical pump 118 is properly tuned to generate an input light beam at a specific wavelength in accordance with a specific configuration of the optical waveguide 108, a significant portion of the energy associated with the input light beam may be maintained in the optical frequency comb generated by the optical frequency comb generation system 100. The proper tuning of the optical pump 118 to correspond to the specific configuration of the optical waveguide 108 may minimize energy losses associated with the optical frequency comb generation process.

The optical waveguide 108 is configured to implement a technique known as phase compensation. Phase compensation is an effect in which different wavelengths of light exhibit different phase shifts upon reflection from or transmission through an optical element. This effect can be used to narrow optical pulses or facilitate wave mixing. The optical resonator 104 is formed in an integrated photonics platform in which optical cavities are formed between the first and second chirped Bragg gratings 110, 114 (also referred to as chirped Bragg grating reflectors). The first and second chirped Bragg gratings 110, 114 are chirped in such a way that they induce additional dispersion by reflecting different wavelengths of light beams in such a way that the wavelengths near the optical pump 118 that will be used to generate the optical frequency comb experience the longest round-trip length. In an example, the cavity length falls of quadratically for increasing wavelength detunings from the optical pump 118. This wavelength dependent cavity length may overcompensate for the normal dispersion exhibited by typical waveguide platforms, driving them into the anomalous dispersion regime in which optical frequency combs may be formed. This technique may enable an optical frequency comb to be formed in any platform of interest, provided it exhibits a low enough propagation loss.

While one configuration of an optical frequency comb generation system 100 has been described, alternative examples may include additional components that facilitate operation of the optical frequency generation system 100. While the first and second chirped Bragg gratings 110, 114 are shown as having five periodic variations, in alternative examples, the first and second chirped Bragg gratings may have a fewer or greater number of periodic variations. While one example of first and second chirp rates are shown, in alternative examples, the first and second chirped Bragg grating may have different chirp rates.

Figure 2:
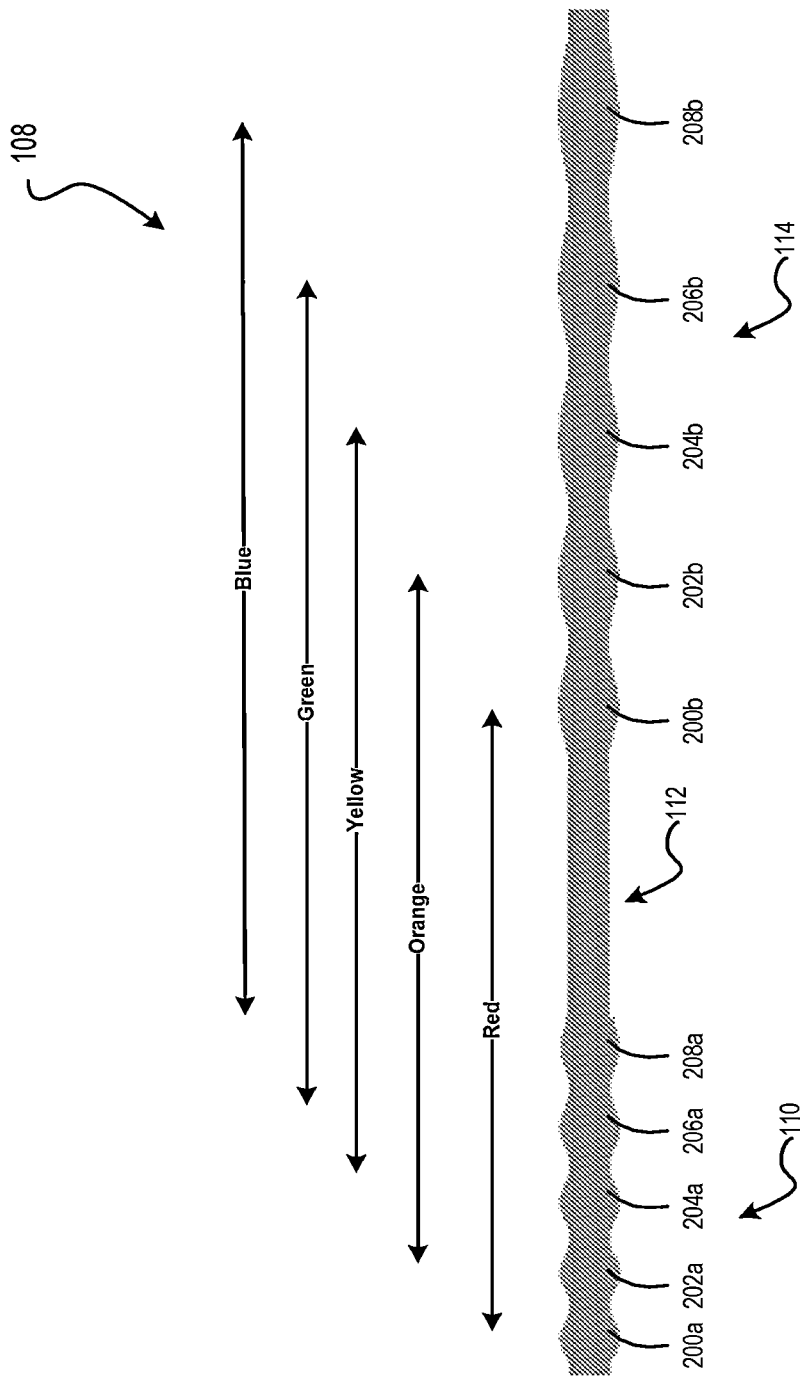
FIG. 2 is a block diagram representation of an exemplary embodiment of an optical waveguide including chirped Bragg gratings.

Referring to FIG. 2, an exemplary embodiment of an optical waveguide 108 is shown. The optical waveguide 108 includes a first chirped Bragg grating 110, a uniform optical waveguide portion 112, and a second chirped Bragg grating 114. The uniform optical waveguide portion 112 has a uniform width. The first chirped Bragg grating 110 is disposed at one end of the uniform optical waveguide portion 112. The second chirped Bragg grating 114 is disposed at the other end of the uniform optical waveguide portion 112.

The first and second chirped Bragg gratings 110, 114 are formed by periodically modulating the width of the optical waveguide 108. The first chirped Bragg grating 110 is periodically modulated to form a plurality of different periodic variations (also known as "chirps") 200a, 202a, 204a, 206a, 208a. The second chirped Bragg gratings 114 is modulated to form the same plurality of different periodic variations 200b, 202b, 204b, 206b, 208b. Each of the plurality of different periodic variations has a different refractive index.

In the exemplary optical waveguide 108, a first periodic variation 200a of the first chirped Bragg grating 110 and a first periodic variation 200b of the second chirped Bragg grating 114 have a same first refractive index, a second periodic variation 202a of the first chirped Bragg grating 110 and the second periodic variation 202b of the second chirped Bragg grating 114 have a same second refractive index, a third periodic variation 204a of the first chirped Bragg grating 110 and a third periodic variation 204b of the second chirped Bragg grating 114 have a same third refractive index, a fourth periodic variation 206a of the first chirped Bragg grating 110 and a fourth periodic variation 206b of the second chirped Bragg grating 114 have a same fourth refractive index, and a fifth periodic variation 208a of the first chirped Bragg grating 110 and a fifth periodic variation 208b of the second chirped Bragg grating 114 have a same fifth refractive index.

The first chirped Bragg grating 110 has a first non-uniform chirp rate associated with the plurality of periodic variations 200a, 202a, 204a, 206a, 208a and the second chirped Bragg grating 114 has a second non-uniform chirp rate associated with the plurality of periodic variations 200b, 202b, 204b, 206b, 208b. The first non-uniform chirp rate of the first chirped Bragg grating 110 is different from the second non-uniform chirp rate of the second chirped Bragg grating 114. In an example, the first chirped Bragg grating 110 has a first linear chirp rate and the second chirped Bragg grating 114 has a second linear chirp rate, where the first linear chirp rate is different from the second linear chirp rate. In an example, the first chirped Bragg grating 110 has a non-linear chirp rate (also referred to as a "bowing" chirp rate) and the second chirped Bragg grating 114 has a linear chirp rate.

The plurality of periodic variations 200a, 202a, 204a, 206a, 208a in the first chirped Bragg grating 110 and the plurality of periodic variations 200b, 202b, 204b, 206b, 208b in the second chirped Bragg gratings 110, 114 define a plurality of cavities in the optical waveguide 108. Each of the cavities extend between a periodic variation 200a, 202a, 204a, 206a, 208a in the first chirped Bragg grating 110 and the corresponding periodic variation 200b, 202b, 204b, 206b, 208b in the second chirped Bragg grating 114.

Each of the plurality of cavities is associated with a corresponding resonant frequency. Each of the plurality of cavities has a resonant frequency that corresponds to a wavelength of a light beam. Each of the plurality of cavities defines a wavelength specific resonator. When a light beam having a wavelength that corresponds to a resonant frequency of a cavity enters that cavity, a portion of that light beam is reflected between the two periodic variations that define the cavity and a portion of the light beam is transmitted to generate a light beam component of the optical frequency comb.

Each different periodic variation corresponds to a different momentum of a different light beam, where the momentum of the light beam is based on the wavelength of that light beam. Accordingly, each different periodic variation corresponds a different wavelength of a light beam. Each cavity is associated with a specific resonant frequency that is defined by the periodic variation associated with that cavity. Each specific resonant frequency is associated with a different wavelength of a light beam.

For example, the exemplary the optical waveguide 108 is configured to generate to receive a blue input light beam that is tuned to the optical waveguide 108 and generate an optical frequency comb including five light beams having different wavelengths. The five light beams are blue, green, yellow, orange, and red. In the exemplary optical waveguide 108, a first cavity extends between the first periodic variation 200a of the first chirped Bragg grating 110 and the corresponding first periodic variation 200b of the second chirped Bragg grating 114 and has a first resonant frequency associated with a wavelength of the red light beam. A second cavity extends between the second periodic variation 202a of the first chirped Bragg grating 110 and the corresponding second periodic variation 202b of the second chirped Bragg grating 114 and has a second resonant frequency associated with a wavelength of the orange light beam. A third cavity extends between the third periodic variation 204a of the first chirped Bragg grating 110 and the corresponding third periodic variation 204b of the second chirped Bragg grating 114 and has a third resonant frequency associated with a wavelength of the yellow light beam. A fourth cavity extends between the fourth periodic variation 206a of the first chirped Bragg grating 110 and the corresponding fourth periodic variation 206b of the second chirped Bragg grating 114 and has a fourth resonant frequency associated with a wavelength of the green light beam. A fifth cavity extends between the fifth periodic variation 208a of the first chirped Bragg grating 110 and the corresponding fifth periodic variation 208b of the second chirped Bragg grating 114 and has a fifth resonant frequency associated with a wavelength of the blue light beam. The blue input light beam has a wavelength that corresponds to the fifth resonant frequency of the fifth cavity. The optical pump 118 is tuned to generate a blue input light beam that has a wavelength that corresponds to the fifth resonant frequency of the fifth cavity.

In an example, there is a quadratic change in the length of the different cavities associated with each of the light beams based on the wavelength of the light beams. A group velocity dispersion is controlled by introducing a quadratic change in cavity length with respect to wavelength using the chirped Bragg gratings having a non-uniform chirp rate.

Each cavity has a different light beam wavelength dependent cavity length. Longer cavities are configured to reflect light beams having the shorter wavelengths. For example, in the exemplary optical waveguide 108, the longest cavity is configured to reflect the light beam having the shortest wavelength, the blue light beam. The second longest cavity is configured to reflect the light beam having the second shortest wavelength, the green light beam. The third longest cavity is configured to reflect the light beam having the third shortest wavelength, the yellow light beam. The fourth longest cavity is configured to reflect the light beam having the fourth shortest wavelength, the orange light beam. The shortest cavity is configured to reflect the light beam having the longest wavelength, the red light beam.

In an example, the length of each cavity in the optical waveguide 108 is a multiple of the wavelength of the associated light beam. For example, the cavity length of the cavity associated with the blue light beam is a multiple of the wavelength of the blue light beam.

Each of the plurality of cavities defines a wavelength specific resonator. For example, the cavity associated with the blue light beam defines a blue light beam specific resonator. The round-trip phase shift associated with each of the resonators defined by a cavity is an integer multiple of $2\pi$. For example, the round-trip phase shift associated with the blue light beam specific resonator is an integer multiple of $2\pi$.

An example of an operation of the optical frequency comb generation system 100 will be describe with respect to the exemplary optical waveguide 108. The optical pump 118 is tuned to generate an input blue light beam that corresponds to the resonant frequency of the resonator defined by the cavity associated with the blue light beam in the optical waveguide 108. New light beams will be generated at frequencies that correspond to resonant frequencies of the cavities in the optical waveguide 108. For example, the exemplary optical waveguide 108 includes five different resonators defined by five different cavities, where the resonant frequency of each of the five resonators (cavities) corresponds to a frequency of one of the five light beams, blue, green, yellow, orange, and red, generated by the optical waveguide 108.

When each of the light beams is generated by the optical waveguide 108, a portion of each of the generated light beams will reflected between the two periodic variations of the two chirped Bragg gratings 110, 114 associated with that light beam wavelength and a portion of each of the generated light beams will be transmitted through the second chirped Bragg 114 grating to form an optical frequency comb that includes each of the light beams generated by the optical waveguide 108. The transmitted power associated with the portion of the light beam transmitted through the second chirped Bragg grating 114 is dependent on the wavelength of that light beam.

For example, in the exemplary optical waveguide 108, a portion of the red light beam will be reflected within the first cavity (resonator) by the first periodic variation 200a of the first chirped Bragg grating 110 and by the first periodic variation 200b of the second chirped Bragg grating 114 and a portion of the red light beam will be transmitted through the first periodic variation 200b of the second chirped Bragg grating 114. The transmitted power associated with the portion of the red light beam transmitted through the first periodic variation 200b of the second chirped Bragg grating 114 is dependent on the wavelength of the red light beam.

A portion of the orange light beam will be reflected within the second cavity (resonator) by the second periodic variation 202a of the first chirped Bragg grating 110 and by the second periodic variation 202b of the second chirped Bragg grating 114 and a portion of the orange light beam will be transmitted through the second periodic variation 202b of the second chirped Bragg grating 114. The transmitted power associated with the portion of the orange light beam transmitted through the second periodic variation 202b of the second chirped Bragg grating 114 is dependent on the wavelength of the orange light beam.

A portion of the yellow light beam will be reflected within the third cavity (resonator) by the third periodic variation 204a of the first chirped Bragg grating 110 and by the third periodic variation 204b of the second chirped Bragg grating 114 and a portion of the yellow light beam will be transmitted through the third periodic 204b variation of the second chirped Bragg grating 114. The transmitted power associated with the portion of the yellow light beam transmitted through the third periodic variation 204b of the second chirped Bragg grating 114 is dependent on the wavelength of the yellow light beam.

A portion of the green light beam will be reflected within the fourth cavity (resonator) by the fourth periodic variation 206a of the first chirped Bragg grating 110 and by the fourth periodic variation 206b of the second chirped Bragg grating 114 and a portion of the green light beam will be transmitted through the fourth periodic variation 206b of the second chirped Bragg grating 114. The transmitted power associated with the portion of the green light beam transmitted through the fourth periodic variation 206b of the second chirped Bragg grating 114 is dependent on the wavelength of the green light beam.

A portion of the blue light beam will be reflected within the fifth cavity (resonator) by the fifth periodic variation 208a of the first chirped Bragg grating 110 and by the fifth periodic variation 208b of the second chirped Bragg grating 114 and a portion of the green light beam will be transmitted through the fifth periodic variation 208b of the second chirped Bragg grating 114. The transmitted power associated with the portion of the blue light beam transmitted through the fifth periodic variation 208b of the second chirped Bragg grating 114 is dependent on the wavelength of the blue light beam.

The optical waveguide 108 will generate an optical frequency comb that includes the portions of the red light beam, the orange light beam, the yellow light beam, the green light beam, and blue light beam that were transmitted through the second chirped Bragg grating 114 in accordance with the transmitted power associated with each of the light beams. The proper tuning of the optical pump 118 to correspond to the specific configuration of the optical waveguide 108 may minimize energy losses associated with the optical frequency comb generation process.

While the exemplary optical waveguide 108 has been described as including five different cavities (resonators) configured to generate an optical frequency comb including light beams having five different wavelengths, alternative exemplary embodiments of the optical waveguide 108 may include a fewer or greater number of optical cavities (resonators) defined by different configurations of the first and second chirped Bragg gratings 110, 114 and generate optical frequency combs including a fewer or greater number of light beams having different wavelengths.

Figure 3:
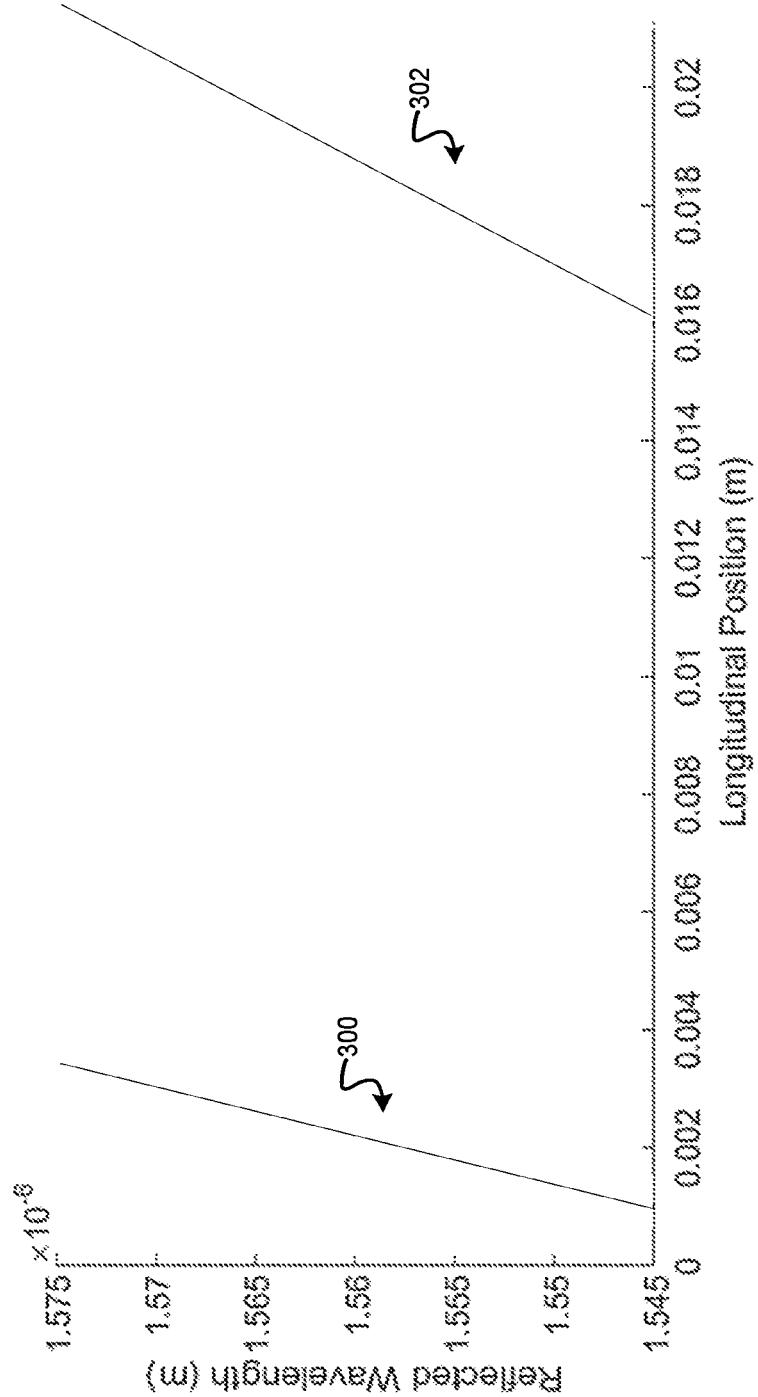
FIG. 3 is a graphical representation of reflected wavelength as a function of longitudinal position along an exemplary optical waveguide including first and second chirped Bragg gratings with linear chirp rates.

Referring to FIG. 3, a graphical representation of reflected wavelength as a function of longitudinal position along an exemplary optical waveguide 108 including first and second chirped Bragg gratings 110, 114 with linear chirp rates is shown. The first Bragg grating 110 is represented by the line 300. The second Bragg grating 114 is represented by the line 302.

Figure 4:
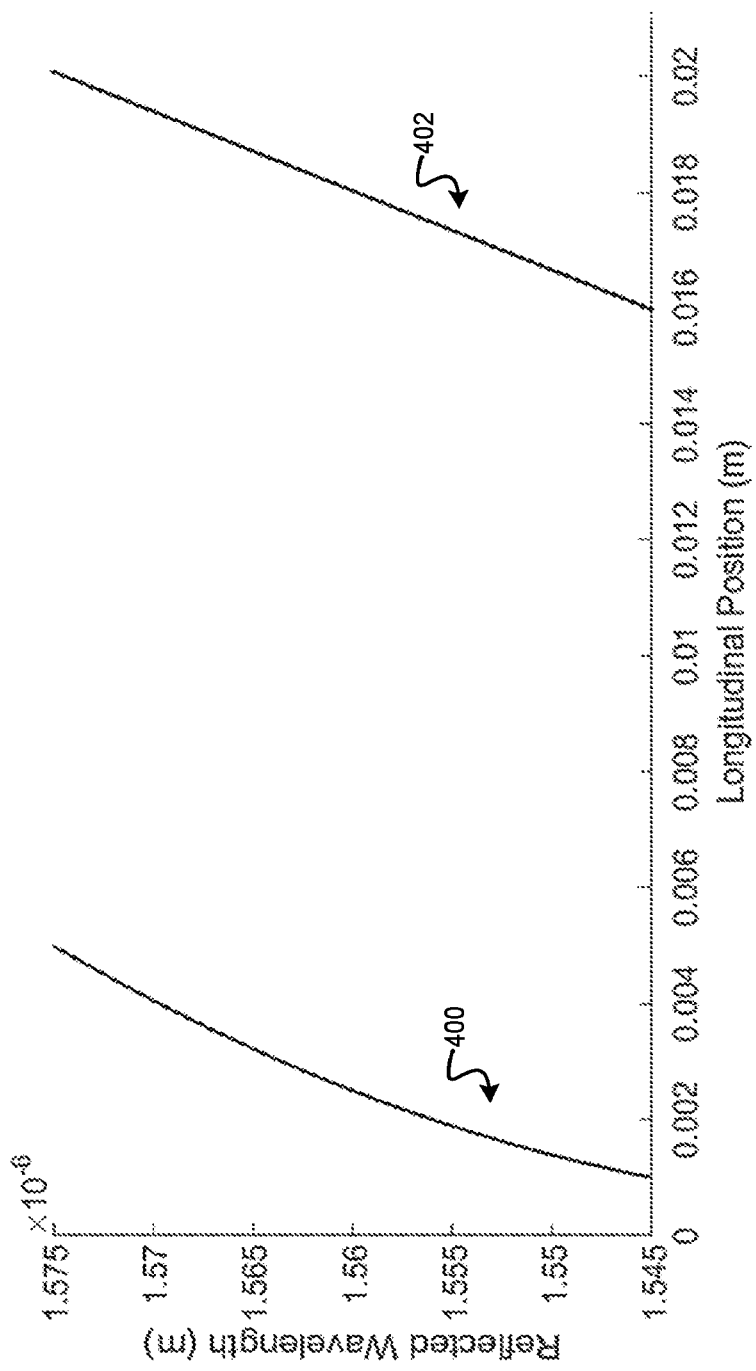
FIG. 4 is a graphical representation of reflected wavelength as a function of longitudinal position along an exemplary optical waveguide including a first chirped Bragg grating with a non-linear chirp rate and a second chirped Bragg grating with a linear chirp rate.

Referring to FIG. 4, a graphical representation of reflected wavelength as a function of longitudinal position along an exemplary optical waveguide 108 including a first chirped Bragg grating 110 with a non-linear chirp rate and a second chirped Bragg grating 114 with a linear chirp rate is shown. The first Bragg grating 110 is represented by the line 400. The second Bragg grating 114 is represented by the line 402.

Figure 5:
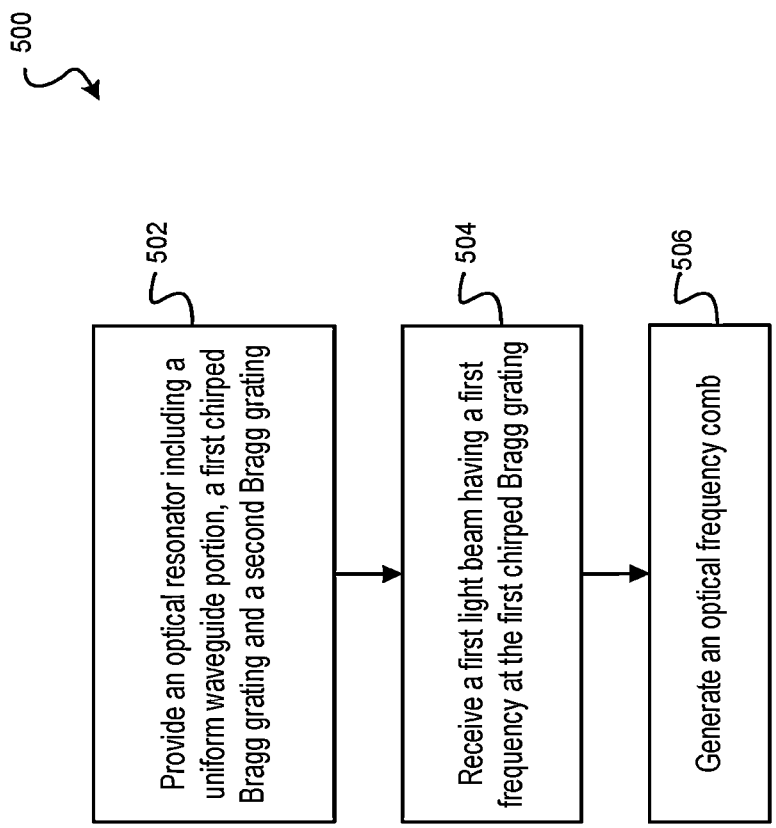
FIG. 5 is a flowchart diagram of an exemplary embodiment of a method of using an optical frequency comb generation system to generate an optical frequency comb.

Referring to FIG. 5, a flowchart representation of an exemplary embodiment of a method 500 of using an optical frequency comb generation system 100 to generate an optical frequency comb is shown. At 502, an optical resonator including a uniform waveguide portion 112, a first chirped Bragg grating 110, and a second chirped Bragg grating 114 is provided. The uniform optical waveguide portion 112 has a uniform waveguide width. The first chirped Bragg grating 110 including at least first and second periodic variations is disposed at a first end of the uniform optical waveguide portion 112. The first periodic variation has a first refractive index and the second periodic variation has a second refractive index. The second chirped Bragg grating 114 is disposed at a second end of the uniform optical waveguide portion 112. The second chirped Bragg grating 114 includes the at least first and second periodic variations. A first cavity associated with a first resonant frequency extends between the first periodic variation of the first chirped Bragg grating 110 and the first periodic variation of the second chirped Bragg grating 114 and a second cavity associated with a second resonant frequency extends between the second periodic variation of the first chirped Bragg grating 110 and the second periodic variation of the second chirped Bragg grating 114. At 504, A first light beam having a first wavelength is received at the first chirped Bragg grating 110. The first wavelength corresponds to the first resonant frequency associated with the first cavity. At 506, an optical frequency comb is generated at the second chirped Bragg grating 114. The optical frequency comb includes at least the first light beam having the first wavelength and a second light beam having a second wavelength corresponding to the second resonant frequency of the second cavity.

The method 500 may include additional steps that facilitate operation of the optical frequency comb generation system 100.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An optical frequency comb generation system comprising:
   a uniform optical waveguide portion having a uniform width;
   a first chirped Bragg grating comprising at least first and second periodic variations disposed at a first end of the uniform optical waveguide portion, the first periodic variation having a first refractive index and the second periodic variation having a second refractive index; and
   a second chirped Bragg grating disposed at a second end of the uniform optical waveguide portion, the second chirped Bragg grating including the at least first and second periodic variations, wherein a first cavity associated with a first resonant frequency extends between the first periodic variation of the first chirped Bragg grating and the first periodic variation of the second chirped Bragg grating and a second cavity associated with a second resonant frequency extends between the second periodic variation of the first chirped Bragg grating and the second periodic variation of the second chirped Bragg grating.

2. The optical frequency comb generation system of claim 1 further comprising:
   an input port coupled to the first chirped Bragg grating and configured to receive a first light beam having a first wavelength, the first wavelength corresponding to the first resonant frequency associated with the first cavity; and
   an output port coupled to the second chirped Bragg grating and configured to transmit an optical frequency comb comprising at least the first light beam having the first wavelength and a second light beam having a second wavelength corresponding to the second resonant frequency of the second cavity.

3. The optical frequency comb generation system of claim 2, wherein a first length of the first cavity is greater than a second length of the second cavity and the second wavelength of the second light beam is greater than the first wavelength of the first light beam.

4. The optical frequency comb generation system of claim 2, wherein:
   the first periodic variation corresponds to a first momentum of the first light beam, the first momentum of the first light beam being dependent at least in part on the first wavelength of the first light beam; and the second periodic variation corresponds to a second momentum of the second light beam, the second momentum of the second light beam being dependent at least in part on the second wavelength of the second light beam.

5. The optical frequency comb generation system of claim 2, wherein a difference between a first length of the first cavity and a second length of the second cavity corresponds to a quadratic change in the first and second cavity lengths based on the first wavelength of the first light beam and the second wavelength of the second light beam.

6. Optical frequency comb generation system of claim 2, wherein a first length of the first cavity is a multiple of the first wavelength of the first light beam and a second length of the second cavity is a multiple of the second wavelength of the second light beam.

7. The optical frequency comb generation system of claim 2, wherein:
the first periodic variations of the first and second chirped Bragg gratings are configured to reflect a first portion of the first light beam within the first cavity and transmit a second portion of the first light beam through the second chirped Bragg grating to the output port; and
the second periodic variations of the first and second chirped Bragg gratings are configured to reflect a first portion of the second light beam within the second cavity and transmit a second portion of the second light beam through the second chirped Bragg grating to the output port.

8. The optical frequency comb generation system of claim 7, wherein a first transmitted power associated with the second portion of the first light beam is dependent in part on the first wavelength of the first light beam and a second transmitted power associated with the second portion of the second light beam is dependent in part on the second wavelength of the second light beam.

9. The optical frequency comb generation system of claim 1, wherein a first non-uniform chirp rate of the first chirped Bragg grating including the at least first and second periodic variations is different from a second non-uniform chirp rate of the second chirped Bragg grating including the at least first and second periodic variations.

10. The optical frequency comb generation system of claim 1, wherein the first chirped Bragg grating has a linear chirp rate and the second chirped Bragg grating has a non-linear chirp rate.

11. The optical frequency comb generation system of claim 1, wherein the first and second chirped Bragg gratings have first and second linear chirp rates, respectively and the first linear chirp rate is different from the second linear chirp rate.

12. The optical frequency comb generation system of claim 1, wherein
the first chirped Bragg grating comprises a plurality of periodic variations including the first and second periodic variations, each of the plurality of periodic variations being associated with one of a plurality of different refractive indices;
the second chirped Bragg grating comprises the plurality of periodic variations including the first and second periodic variations, each of the plurality of periodic variations being associated with one of the plurality of different refractive indices; and
a plurality of cavities including the first and second cavity wherein each of the plurality of cavities has an associated resonant frequency and extends between one of the plurality of periodic variations of the first chirped Bragg grating and a corresponding one of the plurality of the periodic variations of the second chirped Bragg grating having the same refractive index.

13. The optical frequency comb generation system of claim 1, further comprising:
an input port coupled to the first chirped Bragg grating and configured to receive a first light beam having the first wavelength, the first frequency corresponding to the first resonant frequency associated with the first cavity; and
an output port coupled to the second chirped Bragg grating and configured to generate an optical frequency comb comprising a plurality of light beams, a wavelength of each of the plurality of light beams corresponding to a resonant frequency of one of the plurality of cavities.

14. The optical frequency comb generation system of claim 1, further comprising:
a high-speed detector coupled to the output port and configured to generate a radio frequency (RF) signal including a plurality of electrical signals, each of the plurality of electrical signals corresponding to a wavelength of one of the plurality of light beams in the optical frequency comb.

15. The optical frequency comb generation system of claim 1, wherein:
the first chirped Bragg grating has a first constant chirp rate;
the second chirped Bragg grating has second constant chirp rate, the first constant chirp rate being different from the second constant chirp rate; and
one of the first and second chirped Bragg grating has an increasing period as it moves away from a center of an optical resonator defined by the first and second chirped Bragg grating and a slower chirp rate than the other one of the first and second chirped Bragg grating.

16. A method of generating an optical frequency comb comprising:
providing an optical resonator comprising:
a uniform optical waveguide portion having a uniform waveguide width;
a first chirped Bragg grating comprising at least first and second periodic variations disposed at a first end of the uniform optical waveguide portion, the first periodic variation having a first refractive index and the second periodic variation having a second refractive index; and
a second chirped Bragg grating disposed at a second end of the uniform optical waveguide portion, the second chirped Bragg grating including the at least first and second periodic variations, wherein a first cavity associated with a first resonant frequency extends between the first periodic variation of the first chirped Bragg grating and the first periodic variation of the second chirped Bragg grating and a second cavity associated with a second resonant frequency extends between the second periodic variation of the first chirped Bragg grating and the second periodic variation of the second chirped Bragg grating;
receiving a first light beam having a first wavelength at the first chirped Bragg grating, the first wavelength corresponding to the first resonant frequency associated with the first cavity; and
generating an optical frequency comb at the second chirped Bragg grating, the optical frequency comb comprising at least the first light beam having the first wavelength and a second light beam having a second wavelength corresponding to the second resonant frequency of the second cavity.

17. The method of claim 16 further comprising:
reflecting a first portion of the first light beam within the first cavity between the first periodic variations of the first and second chirped Bragg gratings;
reflecting a first portion of the second light beam within the second cavity between the second periodic variations of the first and second chirped Bragg gratings, a length of the first cavity being greater than a length of the second cavity and the second wavelength of the second light beam being greater than the first wavelength of the first light beam; and
transmitting a second portion of the first light beam and a second portion of the second light beam through the second chirped Bragg grating.

18. The method of claim 16, wherein a first non-uniform chirp rate of the first chirped Bragg grating including the at least first and second periodic variations is different from a second non-uniform chirp rate of the second chirped Bragg grating including the at least first and second periodic variations.

19. The method of claim 16, wherein:
the first chirped Bragg grating comprises a plurality of periodic variations including the first and second periodic variations, each of the plurality of periodic variations being associated with one of a plurality of different refractive indices;
the second chirped Bragg grating comprises the plurality of periodic variations including the first and second periodic variations, each of the plurality of periodic variations being associated with one of the different refractive indices; and
a plurality of cavities including the first and second cavity, each of the plurality of cavities extending between one of the plurality of periodic variations of the first chirped Bragg grating and a corresponding one of the plurality of the periodic variations of the second chirped Bragg grating having the same refractive index.

20. The method of claim 19, further comprising:
receiving a first light beam having a first wavelength at the first chirped Bragg grating, the first wavelength corresponding to the first resonant frequency associated with the first cavity; and
generating an optical frequency comb comprising a plurality of light beams, a wavelength of each of the plurality of light beams corresponding to a resonant frequency of one of the plurality of cavities.

* * * * *